(12) United States Patent
Johnson et al.

(10) Patent No.: US 9,183,513 B2
(45) Date of Patent: Nov. 10, 2015

(54) AGGREGRATION, STANDARDIZATION AND EXTENSION OF SOCIAL NETWORKING CONTACTS TO ENHANCE A TELEVISION CONSUMER EXPERIENCE

(75) Inventors: Brian David Johnson, Portland, OR (US); Genevieve Bell, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 12/127,084

(22) Filed: May 27, 2008

(65) Prior Publication Data

US 2009/0300502 A1 Dec. 3, 2009

(51) Int. Cl.
*H04L 12/24* (2006.01)
*G06Q 10/00* (2012.01)

(52) U.S. Cl.
CPC .................................. *G06Q 10/00* (2013.01)

(58) Field of Classification Search
CPC ....................................................... H04L 41/22
USPC .............................. 715/733; 725/46; 709/204
See application file for complete search history.

(56) References Cited

U.S. PATENT DOCUMENTS

| 7,600,189 | B2 * | 10/2009 | Fujisawa | 715/765 |
|---|---|---|---|---|
| 7,603,683 | B2 * | 10/2009 | Reto | 725/34 |
| 7,673,327 | B1 * | 3/2010 | Polis et al. | 726/5 |
| 7,756,756 | B1 * | 7/2010 | Lifson | 705/26.1 |
| 2002/0144273 | A1 | 10/2002 | Reto | |
| 2005/0010949 | A1 * | 1/2005 | Ward et al. | 725/42 |
| 2005/0120084 | A1 * | 6/2005 | Hu et al. | 709/206 |
| 2005/0227676 | A1 * | 10/2005 | De Vries | 455/414.1 |
| 2006/0271953 | A1 | 11/2006 | Jacoby et al. | |
| 2006/0271997 | A1 | 11/2006 | Jacoby et al. | |
| 2007/0006277 | A1 * | 1/2007 | Mills et al. | 725/153 |
| 2007/0101368 | A1 | 5/2007 | Jacoby et al. | |
| 2007/0143397 | A1 * | 6/2007 | Guedalia et al. | 709/203 |
| 2007/0255785 | A1 | 11/2007 | Hayashi et al. | |

(Continued)

FOREIGN PATENT DOCUMENTS

WO 2009/151866 A2 12/2009
WO 2009/151866 A3 2/2010

OTHER PUBLICATIONS

International Search Report and Written Opinion received for PCT Application No. PCT/US2009/044080, mailed on Jan. 6, 2010, 12 Pages.

(Continued)

*Primary Examiner* — Rashawn Tillery
(74) *Attorney, Agent, or Firm* — Garrett IP, LLC

(57) ABSTRACT

A system and method for the aggregation, standardization and extension of social networking contacts to enhance a television consumer experience are described. An embodiment of a system includes a device connected to one or more devices with social networking technology. The device is accessed by a user to invite one or more contacts to join an aggregated social network via an aggregated social networking contact list. The aggregated social networking contact list is to include all contacts associated with the one or more social networking technology devices. The device is to receive and store aggregated social network content and to receive main content. The device is to cause the display of the stored aggregated social network content overlayed on the main content via a user interface on a display device. Other embodiments are described and claimed.

21 Claims, 9 Drawing Sheets

600

Main content section 602

Aggregated social network content section 604

Viewing window 606

(56) References Cited

U.S. PATENT DOCUMENTS

| | | | | |
|---|---|---|---|---|
| 2007/0282949 | A1* | 12/2007 | Fischer et al. | 709/204 |
| 2008/0208973 | A1* | 8/2008 | Hayashi et al. | 709/204 |
| 2008/0276279 | A1* | 11/2008 | Gossweiler et al. | 725/46 |
| 2009/0133070 | A1* | 5/2009 | Hamano et al. | 725/46 |
| 2010/0115413 | A1* | 5/2010 | Schein et al. | 715/733 |

OTHER PUBLICATIONS

International Preliminary Report on Patentability and Written Opinion received for the PCT Application No. PCT/US2009/044080, mailed on Dec. 9, 2010, 7 pages.

Office Action from related application in China; Application No. 200910142021.6, filed May 27, 2009; Office Action mailed Feb. 27, 2012; 8 pages.

Office Action received for Chinese Patent Application No. 200910142021.6, mailed on Jan. 30, 2013, 12 Pages of Office Action including 7 pages of English Translation.

Office Action Received for Chinese Patent Application No. 200910142021.6, mailed on Nov. 1, 2010, 8 pages of Office Action including 4 pages of English Translation.

European Office Action Received for European Patent Application No. 09251358.9, mailed on Jan. 19, 2010, 1 page.

European Search Report Received for European Patent Application No. 09251358.9, mailed on Sep. 29, 2009, 5 pages.

XP002456252, Statement in accordance with the Notice from the European Patent Office dated Oct. 1, 2007 concerning business methods (OJ EPO Nov. 2007, pp. 592-593).

Office Action from related application in China; Application No. 200910142021.6, filed May 27, 2009; Office Action mailed Sep. 21, 2012; 6 pages of translation and 4 of original Office Action.

Office Action received for Chinese Patent Application No. 200910142021.6, mailed on Oct. 16, 2014, 7 pages of English Translation and 5 pages of Chinese Office Action.

Office Action received for Chinese Patent Application No. 200910142021.6, mailed on Feb. 16, 2015, 7 pages of English Translation and 6 pages of Chinese Office Action.

Office Action Received for Chinese Patent Application No. 200910142021.6, mailed on Jul. 1, 2015, 20 pages of Chinese Office Action only.

* cited by examiner

AGGREGATION, STANDARDIZATION AND EXTENSION OF SOCIAL NETWORKING CONTACTS TO ENHANCE A TELEVISION CONSUMER EXPERIENCE

BACKGROUND

Today's homes may have one or more electronic devices that receive, process and/or store content, such as personal computers (PCs), televisions, digital video disk (DVD) players, video cassette recorder (VCR) players, compact disk (CD) players, set-top boxes (STBs), stereo receivers, audio/video receivers (AVRs), media centers, personal video recorders (PVRs), gaming devices, digital camcorders, digital cameras, blackberries, cellular phones, personal digital assistants (PDAs), and so forth. These all may be networked together in such a way to provide a user with a means for entertainment via the entertainment center and a single display device.

At least some of the these electronic devices are adapted to include one or more social networking technologies (e.g., web sharing account technology, buddy lists technology, PC contact list technology or address books via cell phones and blackberries, and so forth). Currently all of the sharing between the electronic devices adapted with social networking technology is a vertical play, meaning it is based on a single service, device or piece of software. For example, the vertical play can consist of a single device (e.g., phone) having lists or a single service (e.g., Yahoo) maintaining contact across multiple devices (e.g., web, mobile phone, etc.). Here, the vertical play is independent of whether it is based on the device or on a service.

DETAILED DESCRIPTION

Various embodiments may be generally directed to the aggregation, standardization and extension of social networking contacts to enhance a television consumer experience. In embodiments, an aggregated social networking contact or buddy list is created. The aggregated contact list may be accessed via a user interface to enable the multi-site and multi-user sharing of content via an aggregated social network in a television consumer experience.

In embodiments, a centralized sharing server is adapted to aggregate social networking contacts for a user into a user interface. The user may then use the user interface to invite one or more contacts to join an aggregated social network. In embodiments, an aggregated social network is digitally mediated and may include a collection or aggregation of friends, family, professional contacts, etc., brought together via a social network. The sharing server creates the aggregated social network and provides content in a television environment to facilitate the sharing of content between the contacts in the network. In other embodiments, a device and software may provide the capability to create and facilitate the aggregated social network. In embodiments, the contacts or users in the aggregated social network, while all connected to the centralized sharing server, are located at multiple sites. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
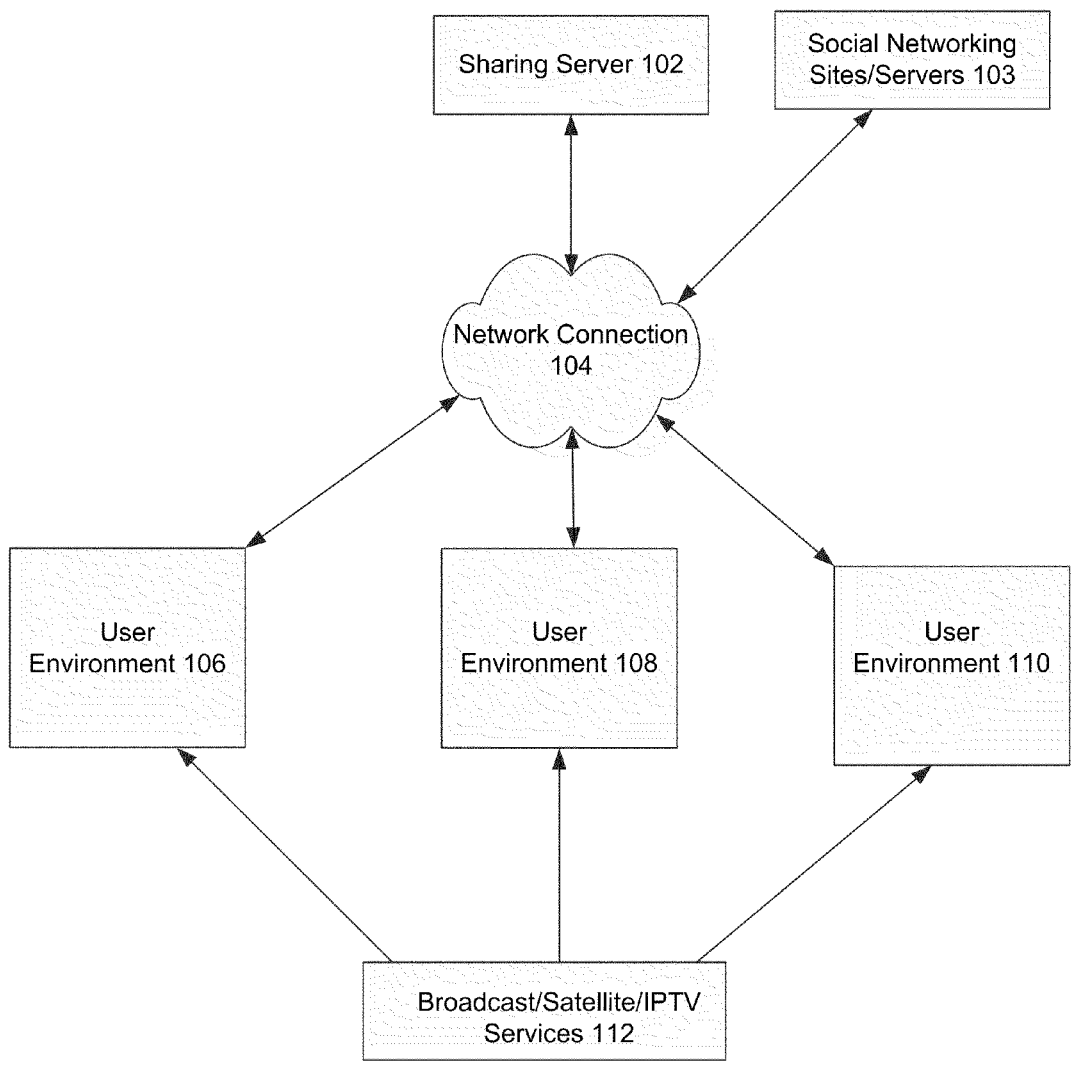
FIG. 1 illustrates one embodiment of a system.

FIG. 1 illustrates an embodiment of a system 100. Referring to FIG. 1, system 100 may comprise a sharing server 102, one or more social networking sites/servers 103, a network connection 104, user environments 106-110 and one or more broadcast/satellite/IPTV services 112. Each of these elements is described next in more detail.

At a high level and in various embodiments, sharing server 102 is adapted to create an aggregated social networking contact or buddy list for a particular user (e.g., one of user environments 106-110). In embodiments, the aggregated contact list may include all contacts available to a particular user via social networking technologies. For example, at least some electronic devices that are available to the user or user environment may be adapted to include one or more social networking technologies (e.g., web sharing account technology, buddy list technology, PC contact list technology or address books via cell phones and blackberries, and so forth). In addition, the user may have access to one or more social networking servers/sites 103. The aggregated contact list extends the vertical sharing of content between social networking contacts to include all contacts available to the user via devices and/or sites that support social networking technologies.

The aggregated social networking contact list may be accessed by the user via a user interface. In embodiments, the user interface may be used to invite one or more contacts or buddies to join an aggregated social network. An example user interface 500 is illustrated in FIG. 5. In embodiments, user interface 500 may be used to enable the multi-site and multi-user sharing of content via an aggregated social network in a television consumer experience. As illustrated in FIG. 5, the user may use a pull down menu of contacts to invite users to join an aggregated social network. An embodiment of how sharing server 102 creates the aggregated social networking contact list will be described below with reference to FIG. 4. User interface 500 is shown for illustration purposes only and is not meant to limit the invention.

In embodiments, once the user indicates which contacts to invite to join an aggregated social network, sharing server 102 creates the network. Here, sharing server 102 authenticates the contacts in the network and receives permission from the contacts to share content. In an embodiment, the content shared may be an indication of the content being currently viewed by contacts in the network.

In embodiments, while all the user environments are located at one or more different sites or locations, they are all connected to sharing server 102. In embodiments, sharing server 102 may be hosted by a content service provider (e.g., a television service provider, for example). Here, each user or user environment connected to sharing server 102 is considered a subscriber of the content service provider hosting server 102. Thus, sharing server 102 may have access to information about each of its subscribers. In embodiments, this information may be derived by server 102 through the knowledge of the various subscription plans each of the subscribers has with the service provider. In other embodiments, server 102 may query each of the subscribers for the necessary information. Embodiments are not limited to these examples.

The distribution or sharing of content may be controlled because the service provider hosts the sharing server where subscriber information is stored, the service provider knows which content is included in a particular subscription with the service provider and other broadcast services and knows of subscriber-defined controls (e.g., parental controls) set up by the subscriber. Therefore, the service provider, prior to allowing content to be distributed to the subscriber (or contact in the aggregated social network), can determine whether the subscriber has access rights to the content and whether the subscriber-defined controls allow for the content to be viewed. In embodiments, the content may also include content available via free television or free web content, for example.

For illustrations purposes only, embodiments of the present invention may be described herein in terms of providing the aggregated social network content in a television environment. It is important to note that embodiments of the present invention are not limited to the television environment. In other embodiments, the controlled sharing of content may be distributed among multiple devices such as televisions, personal computers, any mobile or ultra-mobile electronic device, any connected device (via a person-to-person (P2P) network, for example), and so forth.

In embodiments, shared content may be any type of data. The content may be personal in nature (such as family photographs or video clips), but is not limited to this. In various embodiments, the content may be media information. Examples of media information may generally include any data or signals representing information meant for a user, such as voice information, video information, audio information, image information, textual information, numerical information, alphanumeric symbols, graphics, and so forth. In embodiments, the shared content may be content received via any broadcast/satellite/IPTV service (such as services 112) or connected device such as personal computers (PCs), televisions, digital video disk (DVD) players, video cassette recorder (VCR) players, compact disk (CD) players, set-top boxes (STBs), stereo receivers, audio/video receivers (AVRs), media centers, personal video recorders (PVRs), gaming devices, digital camcorders, digital cameras, blackberries, cellular phones, personal digital assistants (PDAs), and so forth. The embodiments are not limited in this context.

Referring back to FIG. 1, sharing server 102 may communicate with users or user environments 106, 108 and 110 via network connection 104. Network connection 104 may be a high speed network connection or any other type of network connection suited for the particular application. Other types of network connections may be added or substituted as new types of network connections are developed. Although not shown in FIG. 1, the user environments may be connected via a network connection, such as a peer-to-peer (P2P) network connection for example.

Although only three user environments are illustrated in FIG. 1, this is not meant to limit the invention. In fact, system 100 may include any number of user environments.

Figure 2:
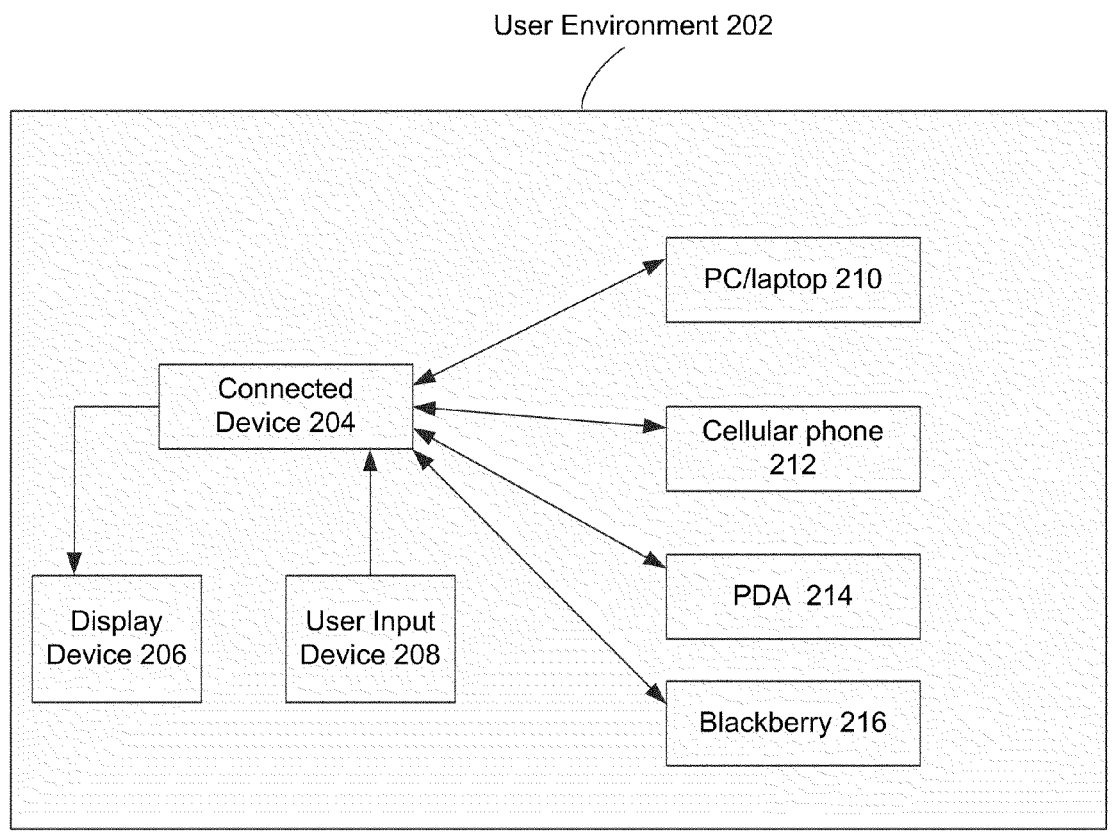
FIG. 2 illustrates one embodiment of a system.

A more detailed embodiment of user environments 106, 108 and 110 is illustrated in system 200 of FIG. 2. Referring to FIG. 2, a user environment 202 may include a connected device 204. Connected device 204 may be owned, borrowed or licensed by their respective user. Connected device 204 is connected to network connection 104 and may communicate with sharing server 102 via its unique IP address, for example. In embodiments, connected device 204 may be connected to other connected devices in user environments via a P2P network and thus may communicate with each other via network connection 104 or the P2P network.

In embodiments, connected device 204 may be connected to one or more devices that include social networking technology. For example, these devices may include but are not limited to, a PC/laptop 210, a cellular phone 212, a PDA 214, a blackberry 216, and so forth.

User environment 202 may also include a display device 206 and a user input device 208. Display device 206 may be a monitor, projector, a conventional analog television receiver, or any other kind of perceivable video display. The audio portion of the output of the connected devices may be routed through an amplifier, such as an audio/video (A/V) receiver or a sound processing engine, to headphones, speakers or any other type of sound generation device. User input device 208 may be any type of input device suited for a user to communicate with connected device 204.

In various embodiments, systems 100 and/or 200 may be implemented as a wireless system, a wired system, or a combination of both. When implemented as a wireless system, systems 100 and 200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, systems 100 and/or 200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 3:
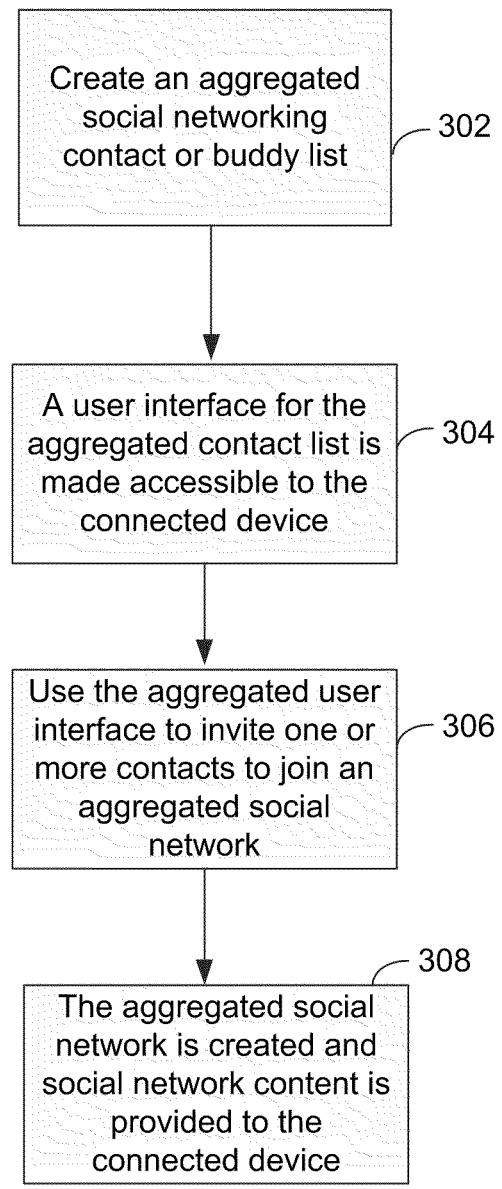
FIG. 3 illustrates one embodiment of a logic flow.

FIG. 3 illustrates one embodiment of a logic flow 300. As shown in logic flow 300, a sharing server (such as sharing server 102 from FIG. 1) creates an aggregated social networking contact list for a user (such as one of user environments 106-110 from FIG. 1) (block 302). A more detailed embodiment of block 302 is described below with reference to FIG. 4.

In embodiments, the sharing server makes a user interface for the aggregated contact list accessible to the connected device of the user environment (block 304). As described above, user interface 500 (FIG. 5) is one such example user interface. The user may access the user interface via the connected device to invite one or more contacts or buddies to join an aggregated social network (block 306). The sharing server creates the network and aggregated social network content is provided to the connected device (block 308). In an embodiment, the aggregated social network involves providing information on what each contact is currently viewing in his or her environment. More details on an example virtual environment will be described below with reference to FIGS. 6 and 7.

Figure 4:
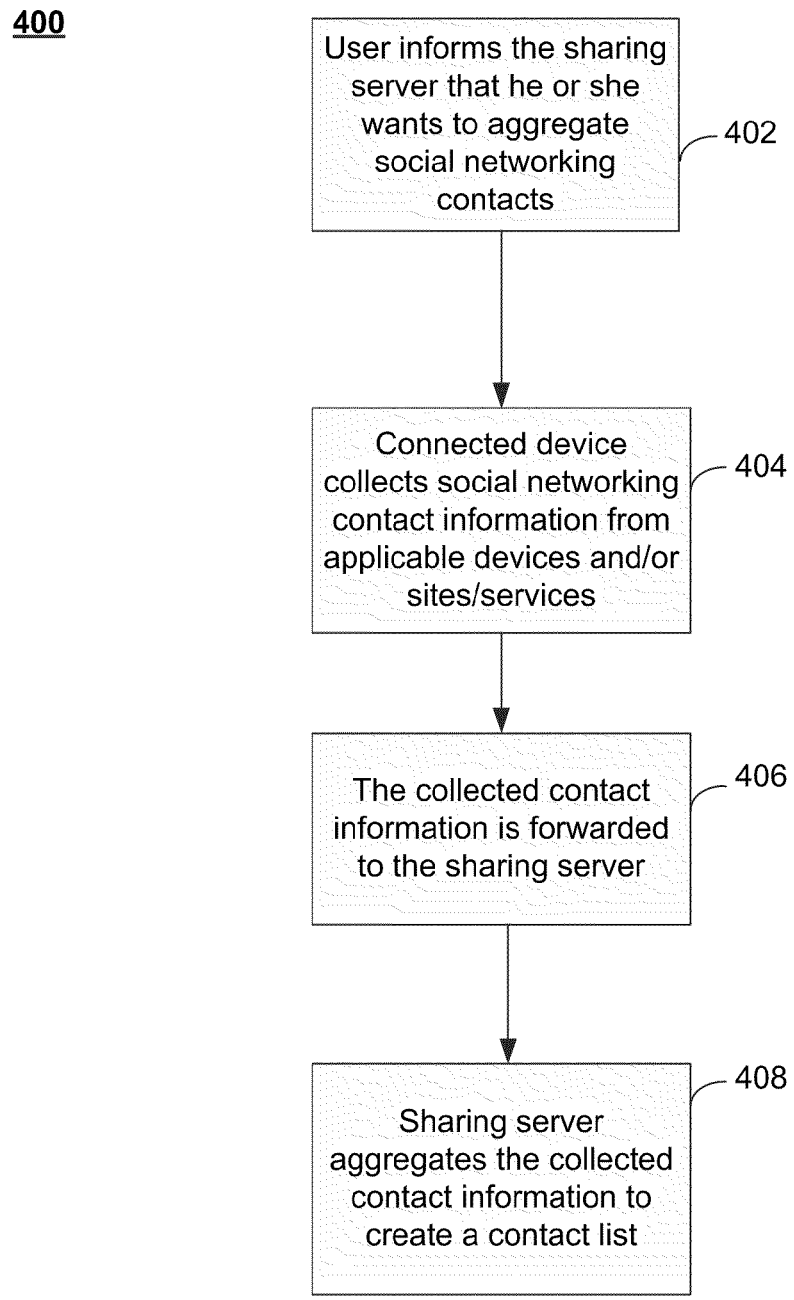
FIG. 4 illustrates one embodiment of a logic flow.
Figure 5:
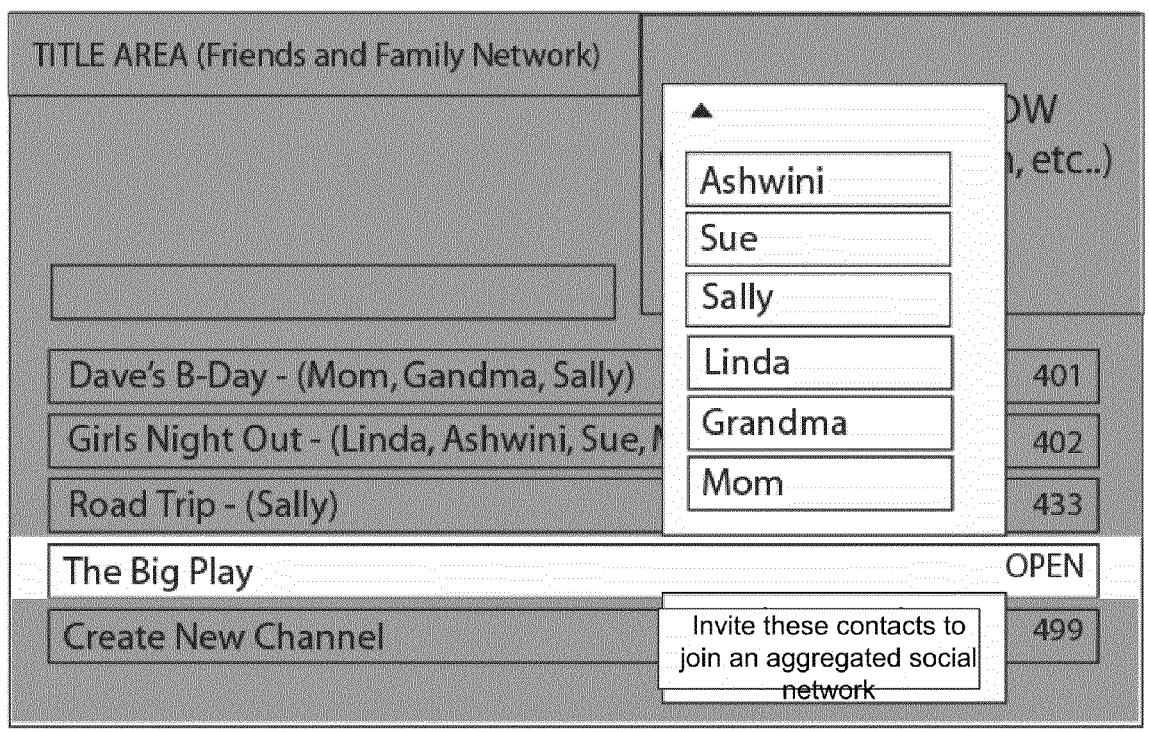
FIG. 5 illustrates one embodiment of a user interface.

FIG. 4 illustrates one embodiment of a logic flow 400 and how the sharing server may create the aggregated social networking contact list for the user. Referring to FIG. 4, a user informs the sharing server that he or she wants to aggregate social networking contacts (block 402). Here, the connected device collects social networking contact information from applicable devices and/or sites/services (block 404). The collected contact information is forwarded to the sharing server (block 406). The sharing server aggregates the contact information to create a contact list (block 408).

More details on an example virtual environment will be described next with reference to FIGS. 6 and 7. In embodiments, the sharing server may then provide the aggregated social network content in a television environment to facilitate the sharing of content between the contacts. For example, the type of content shared between contacts may include, but is not limited to, whether your specified contacts are on-line, what they are currently watching or viewing, who is watching (multiple users at the same location), recommendations for what to watch, invitations to watch what I'm watching while you watch what you're watching, an offer for a gift or service, and so forth. In embodiments, usage history for a particular user or contact may be compiled to be able to make contact passive and active recommendation, monitor parental controls for content, and so forth.

In embodiments, the aggregated social network content may be provided via the display of the aggregated social network content overlayed on other content (such as currently broadcasted content). The aggregated social network and main content may be any type of content, as described above.

Figure 6:
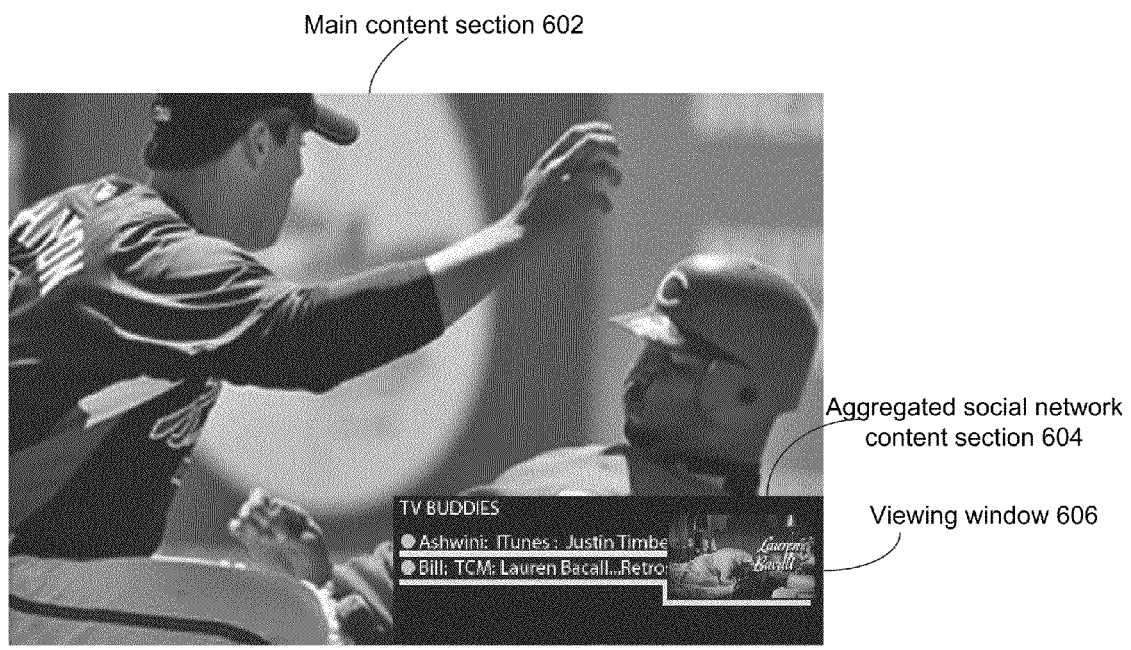
FIG. 6 illustrates one embodiment of a user interface.

FIG. 6 illustrates one embodiment of a user interface 600. User interface 600 may comprise a main content section 602 and an aggregated social network content section 604. Content section 604 may include a viewing window 606. In an embodiment, viewing window 606 displays the content that is currently being viewed by a selected contact in the aggregated social network.

User interface 600 may be displayed on a display device, for example. Although FIG. 6 is illustrated as having one aggregated social network content section, this is not meant to limit the invention. User interface 600 may include multiple aggregated social network content sections and/or viewing windows. Each of these sections is described next in more detail.

In embodiments, main content section 602 displays the primary content that is being watched by a user. The main content may be broadcasted, received via cable or satellite feeds, pre-recorded and stored on a digital recording device (such as a personal video recorder (PVR)), streamed or downloaded via the Internet via an IP connection, stored on a home local area network (LAN), received via various types of video interconnects (e.g., Video Graphics Array (VGA), High-Definition Multimedia Interface (HDMI), component video, composite video, etc.), and so forth. In embodiments, the content being displayed in section 602 cannot be altered by the user. The content displayed in section 602 may include shows or programs, graphics, video games, books, video shorts, video previews, news clips, news highlights, and so forth. Related voice, audio, music, etc., may also be presented with the displayed content in section 602.

In embodiments, content displayed in aggregated social network content section 604 may be any content that may be received by a device connected to a network, such as a home entertainment network. In embodiments, aggregated social network content may be any content or information or graphics (e.g., audio, video or graphics signal) that is overlayed or blended with another content or information or graphics (e.g., audio, video or graphics signal). In embodiments, the aggregated social network content may be streamed or downloaded to the connected device from the Internet via an IP connection (for example, via sharing server 102 and network connection 104 from FIG. 1). In other embodiments, the aggregated social network content may be content received via any USB device connection. This contact may be content that is dynamic or constantly updated via an IP delivered site, system or service or via a USB device, for example. Examples of the types of information provided by content displayed in content section 604 may include whether your specified contacts are on-line, what they are currently watching or viewing (such as what is shown in viewing window 606 of FIG. 6), who is watching (multiple users at the same location), recommendations for what to watch, invitations to watch what I'm watching while you watch what you're watching, an offer of a gift of a piece of content or service (e.g., free or reduced costs for a movie, game, two hours of house cleaning or lawn service, etc.), and so forth. In embodiments, usage history for a particular user or contact may be compiled to be able to make contact passive and active recommendation, monitor parental controls for content, and so forth. Related voice, audio, music, etc., may also be presented with the content in content section 604. User interface 600 may be displayed on a display device (such as display device 206 of FIG. 2). A television may be an example display device.

Referring again to FIG. 6, user interface 600 illustrates one display format where content section 604 is smaller in size than main content section 602 and positioned on the lower right hand area of user interface 600. Embodiments of the invention are not limited to the display format illustrated in FIG. 6. In fact, embodiments of the invention allow the user to customize the content displayed in content section 604 and to customize the position and size of content section 604 in user interface 600. Here, the user may download a program element to a connected device (such as connected device 204 from FIG. 2) from an IP delivered site or service or from a USB device (for example) that allows the user to customize content section 604 to reflect user preferences. The customization of content section 604 may include both the content displayed in content section 604 and the size and location of content section 604 on user interface 600. In embodiments, the user may elect to watch what is being displayed in viewing window 606. Here, viewing window 606 may be expanded to include all of user interface 600.

In embodiments, the user may use the connected device to overlay or blend the streamed or downloaded aggregated social network content with main content on the single display device without altering the main content. In embodiments, the main content may be decoded and then re-encoded with the aggregated social network content. In embodiments, the overlay or blending of the aggregated social network content and main content may be a hardware-enabled overlay or blend via a microprocessor, chipset, graphics card, etc. In other embodiments, the overlay or blending of the aggregated social network content and main content may be a software-enabled overlay or blend via a specific application, operating system, etc. In yet other embodiments, the overlay or blending may be via a combination of hardware and/or software components. In addition, there may be some overlay or blending in the pipes themselves or via another method while the content is in route to the screen. This may be implemented with wireless connection technology, wired connection technology, or a combination of both.

The user may customize or configure user interface 600 directly on the connected device or via a user input device such as a remote control or PC, for example.

Figure 7:
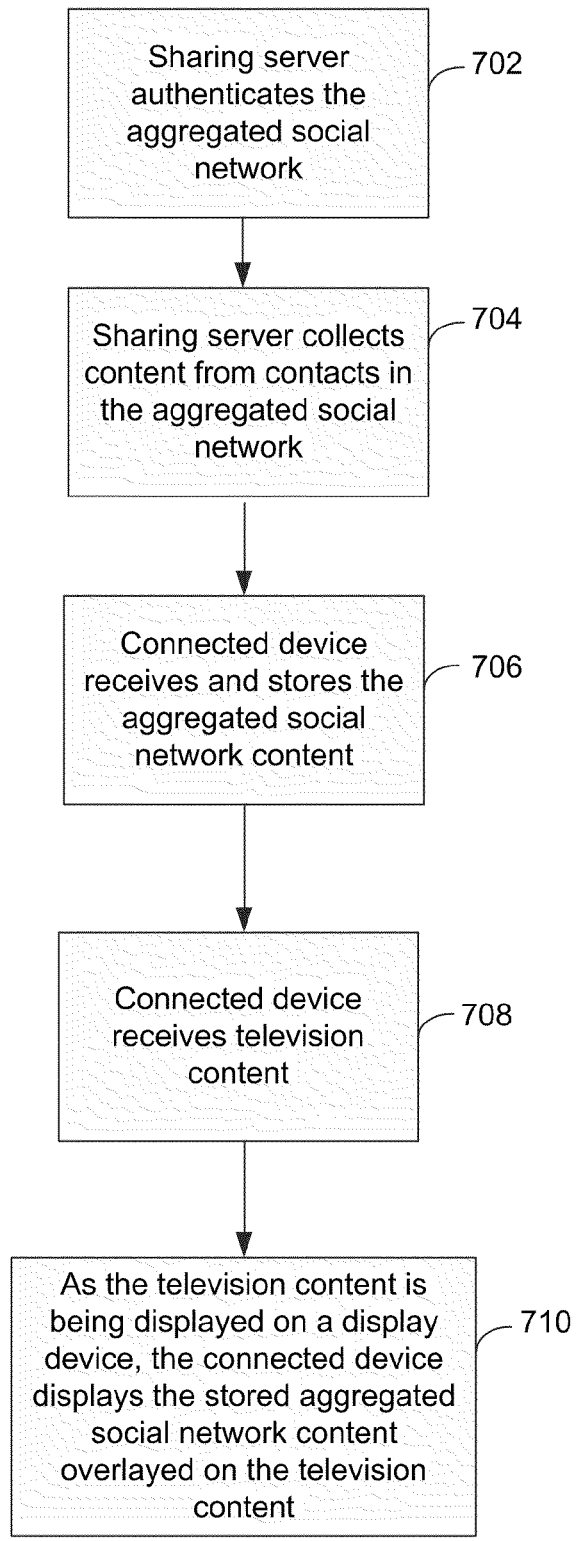
FIG. 7 illustrates one embodiment of a logic flow.

FIG. 7 illustrates one embodiment of a logic flow 700. The logic flow 700 may be representative of the operations executed by one or more embodiments described herein, for example, the operations executed by system 100, system 200 or system 800 (described below).

As shown in logic flow 700, a sharing server (such as sharing server 102 from FIG. 1) authenticates the aggregated social network (block 702). As described above, the sharing server authenticates the contacts in the aggregated social network and receives permission from the contacts to share content. In an embodiment, the content shared in the aggregated social network may be what each of the contacts is currently viewing in his or her user environment.

Each user or user environment connected to the sharing server may be considered a subscriber of the content service provider hosting the sharing server. Thus, the sharing server may have access to information (such as subscription plans) about each of its subscribers. Here, the distribution or sharing of content may be controlled because the service provider hosts the sharing server where subscriber information is stored, the service provider knows which content is included in a particular subscription with the service provider and other broadcast services and knows of subscriber-defined controls (e.g., parental controls) set up by the subscriber. Therefore, the service provider, prior to allowing content to be distributed to the subscriber (or contact in the aggregated social network), can determine whether the subscriber has access rights to the content and whether the subscriber-defined controls allow for the content to be viewed. In embodiments, the content may also include content available via free television or free web content, for example.

The sharing server collects content from the contacts in the aggregated social network (block 704). In embodiments, while all the user environments are located at one or more different sites or locations, they are all connected to sharing server 102.

The connected device receives and stores the aggregated social network content from the sharing server (block 706). In embodiments, the aggregated social network content may be streamed or downloaded to the connected device from the Internet via an IP connection and the sharing server or content received via any USB connection. The aggregated social network content may be any type of content including, but not limited to, images, video, text, and graphical elements. The aggregated social network content may be content that is dynamic or constantly updated via an IP delivered site, system or service or a USB device, for example. Here, the connected device receives and stores the updated aggregated social network content as it is being received.

The connected device receives the main content (block 708). Main content may be any content that is not being altered by a user, but is not limited to this. The main content may be broadcasted, received via cable or satellite feeds, pre-recorded and stored on a digital recording device (such as a personal video recorder (PVR)), streamed or downloaded via the Internet via an IP connection, stored on a home local area network (LAN), received via various types of video interconnects (e.g., Video Graphics Array (VGA), High-Definition Multimedia Interface (HDMI), component video, composite video, etc.), and so forth. The main content may include shows or programs, graphics, video games, books, video shorts, video previews, news clips, news highlights, and so forth.

The connected device may be the source of the main content (e.g., directly receiving broadcast content from the broadcast provider). The connected device may also be a pass-through device for the main content where another source (e.g., STB, DVR, etc.) supplies the main content to the connected device.

It is important to note that blocks 706 and 708 operate in parallel with each other in embodiments of the invention.

As the main content is being displayed on a display device, the connected device displays the stored aggregated social network content overlayed on the main content on the same display device without altering the main content (block 710). In embodiments, the overlay or blending of the aggregated social network content and main content may be a hardware-enabled overlay or blend via a microprocessor, chipset, graphics card, etc. In other embodiments, the overlay or blending of the aggregated social network content and main content may be a software-enabled overlay or blend via a specific application, operating system, etc. In yet other embodiments, the overlay or blending may be via a combination of hardware and/or software components. In addition, there may be some overlay or blending in the pipes themselves or via another method while the content is in route to the screen. This may be implemented with wireless connection technology, wired connection technology, or a combination of both. How the aggregated social network content is displayed with the main content in the user interface may be customized by the user, as described above. The embodiments, however, are not limited to the elements or in the context shown or described in FIG. 7.

Figure 8:
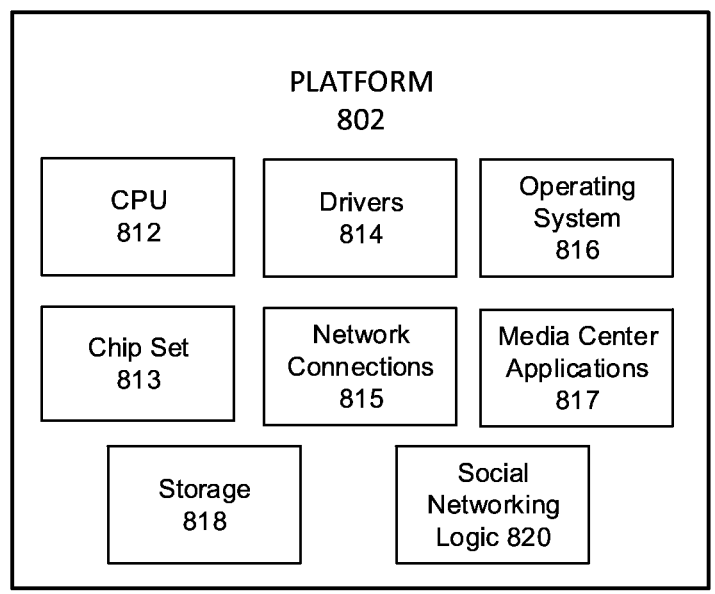
FIG. 8 illustrates one embodiment of a system.

FIG. 8 illustrates an embodiment of a platform 802 (e.g., connected device 204 from FIG. 2). In one embodiment, platform 802 may comprise or may be implemented as a media platform 802 such as the Viiv™ media platform made by Intel® Corporation. In one embodiment, platform 802 may interact with the sharing server (such as sharing server 102 via network connection 104 from FIG. 1).

In one embodiment, platform 802 may comprise a CPU 812, a chip set 813, one or more drivers 814, one or more network connections 815, an operating system 816, and/or one or more media center applications 817 comprising one or more software applications, for example. Platform 802 also may comprise storage 818 and social networking logic 820.

In one embodiment, CPU 812 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 813 may comprise any one of or all of the Intel™ 945 Express Chipset family, the Intel®

955X Express Chipset, Intel® 975X Express Chipset family, plus ICH7-DH or ICH7-MDH controller hubs, which all are made by Intel® Corporation.

In one embodiment, drivers 814 may comprise the Quick Resume Technology Drivers made by Intel® to enable users to instantly turn on and off platform 802 like a television with the touch of a button after initial boot-up, when enabled, for example. In addition, chip set 813 may comprise hardware and/or software support for 5.1 surround sound audio and/or high definition 7.1 surround sound audio, for example. Drivers 814 may include a graphics driver for integrated graphics platforms. In one embodiment, the graphics driver may comprise a peripheral component interconnect (PCI) Express graphics card.

In one embodiment, network connections 815 may comprise the PRO/1000 PM or PRO/100 VE/VM network connection, both made by Intel® Corporation.

In one embodiment, operating system 816 may comprise the Windows® XP Media Center made by Microsoft™ Corporation. In other embodiments, operating system 816 may comprise Linux®, as well as other types of operating systems. In one embodiment, one or more media center applications 817 may comprise a media shell to enable users to interact with a remote control device from a distance of about 10-feet away from platform 802 or a display device, for example. In one embodiment, the media shell may be referred to as a "10-feet user interface," for example. In addition, one or more media center applications 817 may comprise the Quick Resume Technology made by Intel®, which allows instant on/off functionality and may allow platform 802 to stream content to media adaptors when the platform is turned "off."

In one embodiment, storage 818 may comprise the Matrix Storage technology made by Intel® to increase the storage performance enhanced protection for valuable digital media when multiple hard drives are included. In one embodiment, PVR logic 820 is used to enable the functionality of the invention as described herein. The embodiments, however, are not limited to the elements or in the context shown or described in FIG. 8.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
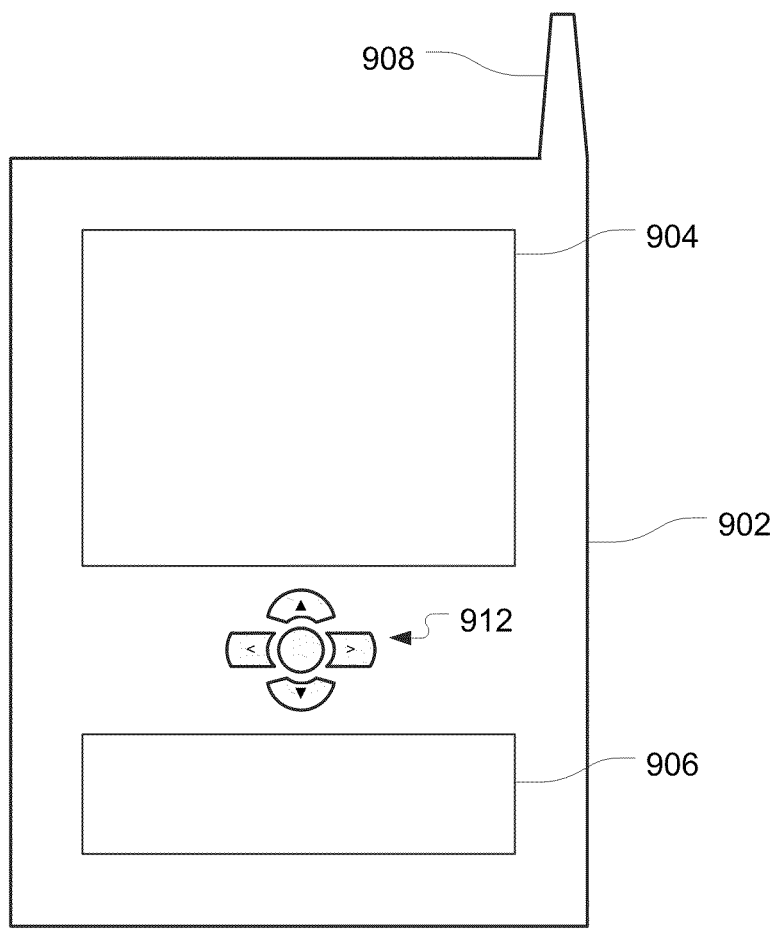
FIG. 9 illustrates one embodiment of a device.

FIG. 9 illustrates one embodiment of a device 900 in which functionality of the present invention as described herein may be implemented. In one embodiment, for example, device 900 may comprise a communication system. In various embodiments, device 900 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, and so forth. The embodiments are not limited in this context.

In one embodiment, device 900 may be implemented as part of a wired communication system, a wireless communication system, or a combination of both. In one embodiment, for example, device 900 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise a five-way navigation button 912. I/O device 906 may comprise a suitable keyboard, a microphone, and/or a speaker, for example. Display 904 may comprise any suitable display unit for displaying information appropriate for a mobile computing device. I/O device 906 may comprise any suitable I/O device for entering information into a mobile computing device. Examples for I/O device 906 may include an alphanumeric keyboard, a numeric keypad, a touch pad, input keys, buttons, switches, rocker switches, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor devices, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
a sharing server to communicate with multiple connection devices;
wherein a first one of the connection devices is configured to communicate with user devices within a local user environment to collect social network contacts of a user from one or more of the user devices;
wherein the sharing server is configured to combine the social network contacts of the user as an aggregated social networking contact list of the user, and provide the aggregated social networking contact list of the user to the first connection device;
wherein the first connection device is further configured to permit the user to initiate an aggregated social network, including to permit the user to select contacts of the aggregated social networking contact list to invite as members of the aggregated social network;
wherein the sharing server is further configured to host the aggregated social network, including to receive permission from the members of the aggregated social network to share content of the respective members within the aggregated social network, aggregate content shared by the members as aggregated social network content, and provide the aggregated social network content to connection devices of the respective members; and
wherein the connection devices are further configured to combine the aggregated social network content with main content of the respective connection devices, and to provide the combined content to respective displays.

2. The system of claim 1, wherein the first connection device is further configured to collect social networking contacts from a user device that is configured with a social networking technology that includes one or more of a buddy list technology, a web sharing technology, and a personal computer contact list technology.

3. The system of claim 1, wherein the display includes a television.

4. The system of claim 1, wherein the main content includes broadcast content.

5. The system of claim 1, wherein the aggregated social network content includes an indication of multiple persons viewing content presented on one of the displays.

6. The system of claim 1, wherein the aggregated social network content includes main content of a second one of the connection devices, and wherein the first connection device is further configured to insert the main content of the second connection device as a picture-within-a-picture of the main content of the first connection device.

7. A method, comprising:
communicating between a sharing server and each of multiple connection devices;
communicating between a first one of the connection devices and user devices within a local user environment to collect social network contacts of a user from one or more of the user devices;
combining the social network contacts of the user as an aggregated social networking contact list of the user;
permitting the user to initiate an aggregated social network, including permitting the user to select contacts of the aggregated social networking contact list to invite as members of the aggregated social network;
hosting the aggregated social network on the sharing server, including receiving permission from the members of the aggregated social network to share content of the respective members within the aggregated social network, aggregating content shared by the members as the aggregated social network content, and providing the aggregated social network content to the connection devices of the respective members; and combining the aggregated social network content with main content of the respective connection devices, and providing the combined content to respective displays.

8. The method of claim 7, wherein the communicating includes collecting social networking contacts from a user device that is configured with a social networking technology that includes one or more of a buddy list technology, a web sharing technology, and a personal computer contact list technology.

9. The method of claim 7, wherein the display includes a television.

10. The method of claim 7, wherein the main content includes broadcast content.

11. The method of claim 7, wherein the aggregated social network content includes an indication of multiple persons viewing content presented on one of the displays.

12. The method of claim 7, wherein the aggregated social network content includes main content of a second one of the connection devices, and wherein the combining includes inserting the main content of the second connection device as a picture-within-a-picture of the main content of the first connection device.

13. A non-transitory computer readable medium encoded with a computer program that includes instructions to cause a processor to:

cause a processor of a sharing server to communicate with multiple connection devices;

cause a processor of a first one of the connection devices to communicate with user devices within a local user environment to collect social network contacts of a user from one or more of the user devices;

cause the processor of the sharing server to combine the social network contacts of the user as an aggregated social networking contact list of the user, and provide the aggregated social networking contact list of the user to the first connection device;

cause the processor of the first connection device to permit the user to initiate an aggregated social network, including to permit the user to select contacts of the aggregated social networking contact list to invite as members of the aggregated social network;

cause the processor of the sharing server to host the aggregated social network on the sharing server, including to receive permission from the members of the aggregated social network to share content of the respective members within the aggregated social network, aggregate content shared by the members as the aggregated social network content, and provide the aggregated social network content to the connection devices of the respective members; and cause the processor of the respective connection devices to combine the aggregated social network content with main content of the respective connection devices, and provide the combined content to respective displays.

14. The computer readable medium of claim 13, further including instructions to cause the processor of the first connection device to collect social networking contacts from a user device that is configured with a social networking technology that includes one or more of a buddy list technology, a web sharing technology, and a personal computer contact list technology.

15. The computer readable medium of claim 13, wherein the display device includes a television.

16. The computer readable medium of claim 13, wherein the main content includes broadcast content.

17. The computer readable medium of claim 13, wherein the aggregated social network content includes an indication of multiple persons viewing content presented on one of the displays.

18. The computer readable medium of claim 13, wherein the aggregated social network content includes main content of a second one of the connection devices, and wherein the first connection device is further configured to insert the main content of the second connection device as a picture-within-a-picture of the main content of the first connection device.

19. The system of claim 1, wherein the aggregated social network content includes an offer of a gift of a piece of content or service.

20. The method of claim 7, wherein the aggregated social network content includes an offer of a gift of a piece of content or service.

21. The machine-readable storage medium of claim 13, wherein the aggregated social network content includes an offer of a gift of a piece of content or service.

* * * * *